No. 763,578. PATENTED JUNE 28, 1904.
E. L. WALKER.
GRAPE BASKET.
APPLICATION FILED SEPT. 28, 1903.
NO MODEL. 2 SHEETS—SHEET 1.

No. 763,578. PATENTED JUNE 28, 1904.
E. L. WALKER.
GRAPE BASKET.
APPLICATION FILED SEPT. 28, 1903.
NO MODEL. 2 SHEETS—SHEET 2.
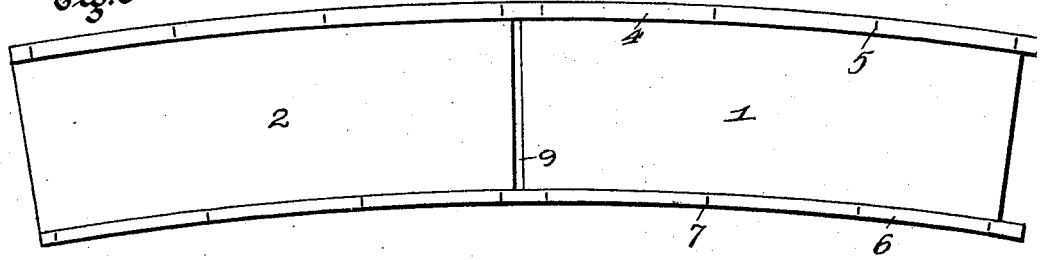
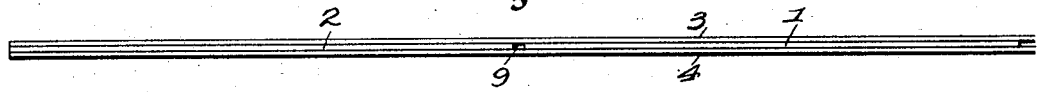
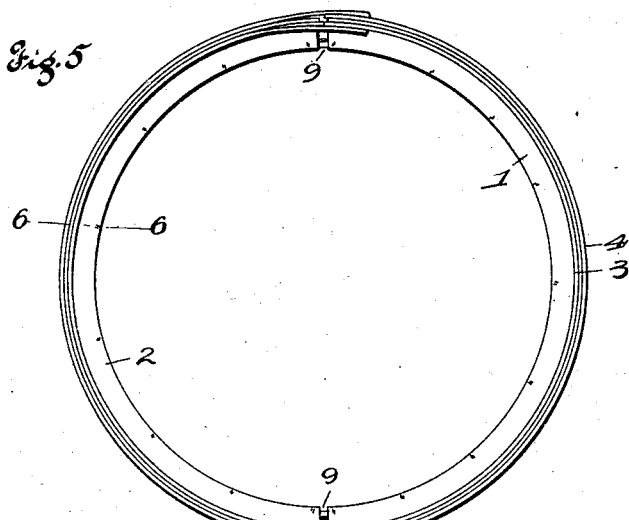
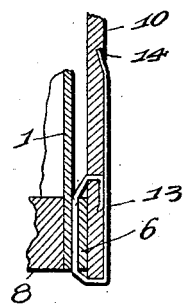
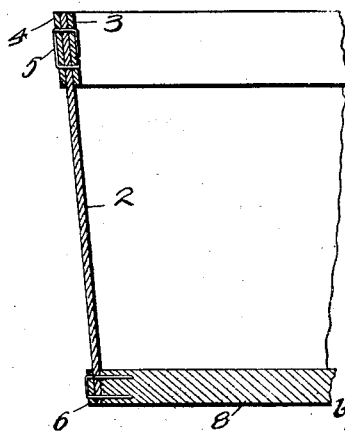

No. 763,578. Patented June 28, 1904.

UNITED STATES PATENT OFFICE.

ENOS L. WALKER, OF ST. LOUIS, MISSOURI.

GRAPE-BASKET.

SPECIFICATION forming part of Letters Patent No. 763,578, dated June 28, 1904.

Application filed September 28, 1903. Serial No. 174,967. (No model.)

*To all whom it may concern:*

Be it known that I, ENOS L. WALKER, a citizen of the United States, residing at St. Louis, State of Missouri, have invented certain new and useful Improvements in Grape-Baskets, of which the following is a specification containing a full, clear, and exact description, reference being had to the accompanying drawings, forming a part hereof.

My invention relates to grape-baskets, my object being to construct a basket in which the wall appears to be a continuous and endless piece of veneer, thereby greatly improving the appearance of the basket and at the same time producing a basket with no apparent unbroken cracks through which the contents may be exposed; and my improved grape-basket comprises two sections of veneer, an upper and a lower rim connecting said sections to form a continuous wall, said rims being outside of the wall, with air-spaces between the meeting edges of the veneer sections, a bottom within said wall and giving the desired shape, with the air-spaces at the sides of the bottom and directly opposite each other, and a handle secured in position outside of the rims and in position to cover said air-spaces, said rims serving as spacing-blocks to hold the handle away from the veneer sections and allow the air to pass freely through the air-spaces.

Figure 1:
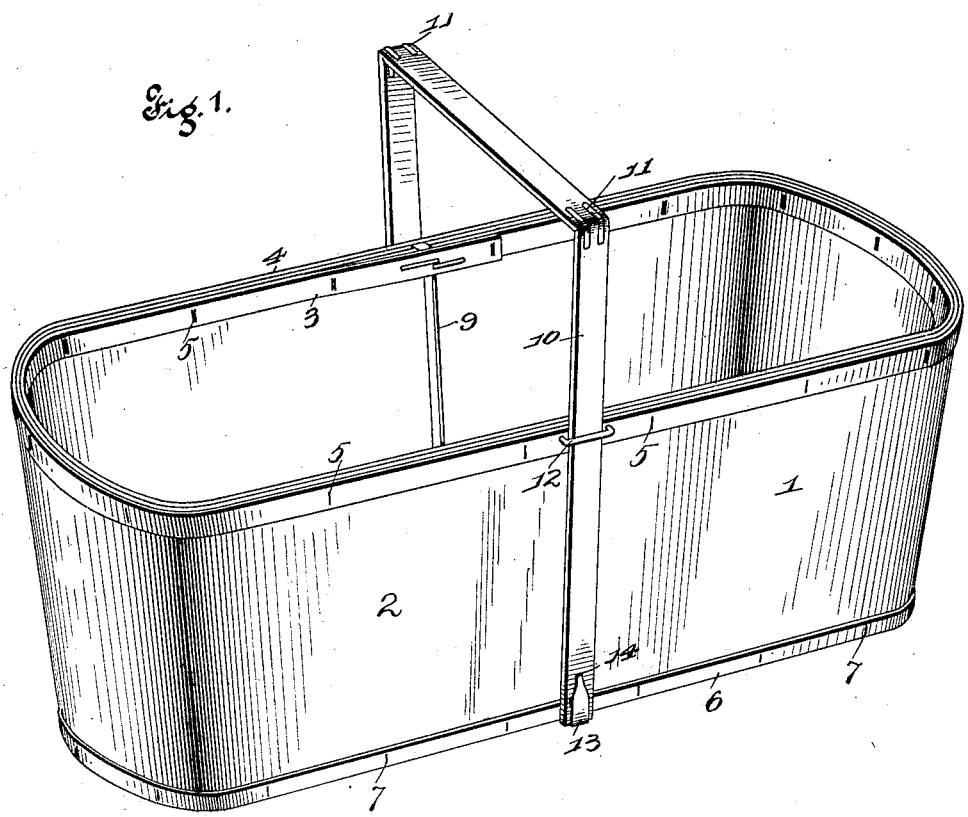
Figure 2:
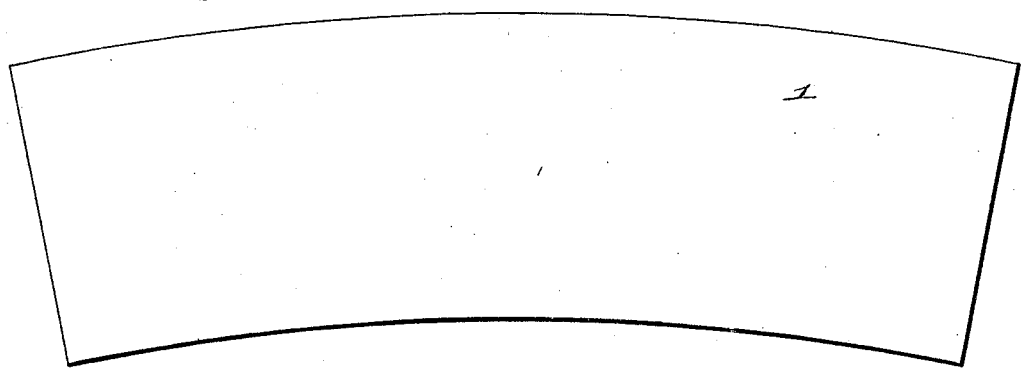

In the drawings, Figure 1 is a perspective view of my basket with the handle attached. Fig. 2 is a plan view of one of the wooden veneer sections. Fig. 3 is a plan view of the two veneer sections out of which the basket is constructed with the reinforcing-bands applied thereto. Fig. 4 is a top edge view of the veneer sections, and Fig. 5 is a top view of the basket with the handle removed before the bottom is put in. Fig. 6 is a section on the line 6 6 of Fig. 5. Fig. 7 is a sectional view of one end of the handle, showing how the same is applied to the lower rim of the basket.

The object of my invention is to construct a grape-basket wherein is employed only two pieces or sections of continuous and imperforate wooden veneer.

Heretofore grape-baskets have been made out of two side sections of veener and two end sections, and in the formation of such baskets it was necessary to lap the end section within the side sections, thus requiring considerable veneer to construct the basket. According to my invention a great amount of wooden veneer is saved in the lap and the number of individual sections composing the basket is reduced to two, thus cheapening the cost of manufacture, as the assembling of the parts is more simple and not so much material is required. The basket is also made considerably stronger, as there is no lap at the ends.

Referring to the drawings, 1 indicates one end section out of which the basket is constructed, and 2 the other section, the said sections being of the same size and shape and mathematical in dimensions, being true segments of a circular plane or band. Said segments, if continued, would form a circular band confined between two concentric circles, and hence said sections are mathematically proportioned and are made out of a single and continuous piece of wooden veneer. After said sections 1 and 2 have been cut as described they are secured together as illustrated in Fig. 3, the top edges of said sections being united by an inside rim 3 and an outside rim 4, said sections being interposed between said rims 3 and 4 and all being secured together by means of staples 5. The lower edges of said sections are united by means of an outside rim 6 being secured to said sections by means of staples 7. When the said sections have been secured together by means of the rims 3, 4, and 6 and staples 5 and 7, the basket is in the form of a circle, as illustrated in Fig. 5. When the basket has assumed this stage of construction, I then insert the bottom 8, which is pushed down from the top or mouth of the basket. The flaring nature of the basket tends to hold the bottom 8 in place; but should further securing be deemed necessary staples or brads may be inserted through the rim 6 and sections 1 and 2 into the bottom 8. In the process of manufacture the rims 3, 4, and 6 are secured to the sections 1 and 2 at the same time. The shape of the sections 1 and 2 when united as heretofore described produces when assembled into the basket a flaring-mouth basket. When the rims are applied to the veneer sections, air-spaces 9 are left between the meeting edges of the veneer sections and the handle is attached in position against the outer sides of the outer rim, said rims serving as spacing-blocks to hold the handle away from the veneer sections and allow the air to pass freely through the air-spaces.

The handle which I have shown in this application is a detachable one and is made out of a single piece of material, being scored where it bends and the bent portion at the score being reinforced by means of staples 11. The handle 10 is secured to the basket by means of staples 12 and the flexible metallic tongues 13 located on the lower ends of the handle. The ends of said tongues are secured to the ends of the handle, and in applying the ends to the basket the tongues are inserted between the rim 6 and the body of the basket and then bent around the lower edge of the rim 6, and the free ends of said tongues are then inserted in notches 14 of the handle.

It will be seen from the foregoing description that my basket is constructed of two solid continuous imperforate sections of wooden veneer in the shape of a segment of an annular band.

Having fully described my invention, what I claim is—

1. A grape-basket, comprising the veneer sections 1 and 2, said sections being true segments of a circular band; the rims 4 and 6 connecting said veneer sections together, there being air-spaces 9 between the meeting edges of said sections, and said rims being outside of the said sections; and a handle secured in position against the outer faces of said rims in position to cover said air-spaces, said rims serving as spacing-blocks to hold the handle away from the veneer sections and allow the air to pass freely through said air-spaces; substantially as specified.

2. A grape-basket, comprising the veneer sections 1 and 2, said sections being true segments of a circular band; the rims 4 and 6 connecting said veneer sections together, there being air-spaces 9 between the meeting edges of said sections, and said rims being outside of the said sections; a handle 10 placed in position against the outer faces of the rims in position to cover said air-spaces, said rims serving as spacing-blocks to hold the handle away from the veneer sections and allow the air to pass freely through the air-spaces; the flexible metallic tongues 13 secured to the inner sides of the ends of the handle and passing downwardly inside of the lower rim, and outwardly and upwardly, and secured to the outer sides of the ends of the handle; substantially as specified.

In testimony whereof I have signed my name to this specification in presence of two subscribing witnesses.

ENOS L. WALKER.

Witnesses:
ALFRED A. EICKS,
M. G. IRION.